(12) United States Patent
Lazzaro et al.

(10) Patent No.: US 10,890,467 B2
(45) Date of Patent: Jan. 12, 2021

(54) SYSTEMS AND METHODS FOR SENSING THROUGH A WINDOW

(71) Applicant: THE BOEING COMPANY, Chicago, IL (US)

(72) Inventors: Anthony Lazzaro, Albuquerque, NM (US); Dale Parkes, Albuquerque, NM (US)

(73) Assignee: THE BOEING COMPANY, Chicago, IL (US)

( * ) Notice: Subject to any disclaimer, the term of this patent is extended or adjusted under 35 U.S.C. 154(b) by 171 days.

(21) Appl. No.: 16/052,186

(22) Filed: Aug. 1, 2018

(65) Prior Publication Data

US 2020/0041314 A1 Feb. 6, 2020

(51) Int. Cl.

| | |
|---|---|
| *G01D 11/02* | (2006.01) |
| *B60R 11/04* | (2006.01) |
| *B64D 47/08* | (2006.01) |
| *G03B 15/00* | (2006.01) |
| *H04N 5/225* | (2006.01) |
| *H04N 5/232* | (2006.01) |

(52) U.S. Cl.
CPC ............. *G01D 11/02* (2013.01); *B60R 11/04* (2013.01); *B64D 47/08* (2013.01); *G03B 15/006* (2013.01); *H04N 5/2253* (2013.01); *H04N 5/23216* (2013.01)

(58) Field of Classification Search
CPC ........ B60R 11/04; B64D 47/08; G01D 11/02; G01D 11/30; H04N 5/2253; H04N 5/23216; G03B 15/006
USPC .................................................... 73/866.5
See application file for complete search history.

(56) References Cited

U.S. PATENT DOCUMENTS

| | | | | |
|---|---|---|---|---|
| 5,016,035 | A * | 5/1991 | Myles, Jr. | G03B 17/40 396/2 |
| 5,900,925 | A * | 5/1999 | Navarro | H04N 5/232 348/E5.022 |
| 7,626,152 | B2 | 12/2009 | King et al. | |
| 8,654,314 | B2 | 2/2014 | King et al. | |
| 2003/0048376 | A1* | 3/2003 | Peeples | B66C 13/46 348/373 |
| 2008/0042042 | A1 | 2/2008 | King et al. | |
| 2015/0098608 | A1* | 4/2015 | Hintermeister | G06K 9/00 382/103 |
| 2015/0312468 | A1* | 10/2015 | Taylor | H04N 5/23206 348/47 |
| 2016/0320630 | A1 | 11/2016 | Donaldson et al. | |

* cited by examiner

*Primary Examiner* — John Fitzgerald
*Assistant Examiner* — Truong D Phan
(74) *Attorney, Agent, or Firm* — The Small Patent Law Group LLC; Joseph M. Butscher (57) ABSTRACT

A system is provided that includes a gimbal yoke, a gimbal swing arm, an elevation tilt platform, and a sensor. The gimbal yoke is configured to rotate about an azimuth rotation axis. The gimbal swing arm is rotationally coupled to the gimbal yoke, and is configured to rotate about an elevation rotation axis. The elevation rotation axis is oriented perpendicular to the azimuth rotation axis. The elevation tilt platform is rotationally coupled to the gimbal swing arm, and is configured to rotate about a tilt rotation axis. The tilt rotation axis is oriented parallel to the elevation rotation axis. The sensor is disposed on the elevation tilt platform. The sensor defines a line of sight.

20 Claims, 5 Drawing Sheets

SYSTEMS AND METHODS FOR SENSING THROUGH A WINDOW

FIELD OF EMBODIMENTS OF THE DISCLOSURE

Embodiments of the present disclosure generally relate to systems and methods for controlling orientation of one or more sensors, for example, through a window of an aircraft.

BACKGROUND OF THE DISCLOSURE

Sensors (e.g., cameras) may be utilized in various environments, including on-board aircraft to acquire visual or optical information of a surrounding environment. For example, high speed aircraft may utilize wide field of regard sensor systems that utilize protrusions or turrets to house the sensor systems. However, such protrusions reduce performance and/or stealth.

SUMMARY OF THE DISCLOSURE

Accordingly, improved sensor positioning and orientation, for example, without requiring the use of turrets, is provided in various embodiments disclosed herein.

Certain embodiments of the present disclosure provide a system that includes a gimbal yoke, a gimbal swing arm, an elevation tilt platform, and a sensor. The gimbal yoke is configured to rotate about an azimuth rotation axis. The gimbal swing arm is rotationally coupled to the gimbal yoke, and is configured to rotate about an elevation rotation axis. The elevation rotation axis is oriented perpendicular to the azimuth rotation axis. The elevation tilt platform is rotationally coupled to the gimbal swing arm, and is configured to rotate about a tilt rotation axis. The tilt rotation axis is oriented parallel to the elevation rotation axis. The sensor is disposed on the elevation tilt platform. The sensor defines a line of sight.

Certain embodiments of the present disclosure provide a system. The system includes an enclosure, a gimbal yoke, a gimbal swing arm, an elevation tilt platform, and a sensor. The enclosure has a boundary defining an interior and an exterior, and includes an aperture disposed along the boundary. The gimbal yoke is disposed within the interior of the enclosure and is configured to rotate about an azimuth rotation axis. The gimbal swing arm is rotationally coupled to the gimbal yoke, and is configured to rotate about an elevation rotation axis. The elevation rotation axis is oriented perpendicular to the azimuth rotation axis. The elevation tilt platform is rotationally coupled to the gimbal swing arm, and is configured to rotate about a tilt rotation axis. The tilt rotation axis is oriented parallel to the elevation rotation axis. The sensor is disposed on the elevation tilt platform. The sensor defines a line of sight passing through the aperture.

Certain embodiments of the present disclosure provide a method. The method includes providing a system within an enclosure that has a boundary defining an interior and an exterior. The enclosure includes an aperture disposed along the boundary, with the system including a gimbal yoke, a gimbal swing arm, an elevation tilt platform, and a sensor. The gimbal yoke is disposed within the interior of the enclosure and is configured to rotate about an azimuth rotation axis. The gimbal swing arm is rotationally coupled to the gimbal yoke and is configured to rotate about an elevation rotation axis that is oriented perpendicular to the azimuth rotation axis. The elevation tilt platform is rotationally coupled to the gimbal swing arm and is configured to rotate about a tilt rotation axis that is oriented parallel to the elevation rotation axis. The sensor is disposed on the elevation tilt platform, and defines a line of sight passing through the aperture. The method also includes controlling the system to orient the sensor to define a first line of sight passing through a predetermined target point on the aperture. Further, the method includes acquiring first data using the sensor oriented along the first line of sight. The method also includes controlling the system to re-orient the sensor to define a second line of sight passing through the predetermined target point on the aperture; and acquiring second data using the sensor oriented along the second line of sight.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide systems and methods for positioning or orienting one or more sensors for acquiring visual or optical information (e.g., cameras and/or lasers). Various embodiments utilize structures disposed within the interior of an aircraft (or other environment) that remove the need for a turret or other protrusion. Various embodiments provide for the continued passage of a line of sight of a sensor through a predetermined target on an aperture as the line of sight of a sensor is moved or re-oriented, allowing for use of an aperture (e.g., window) that has a relative small surface area.

Figure 1:
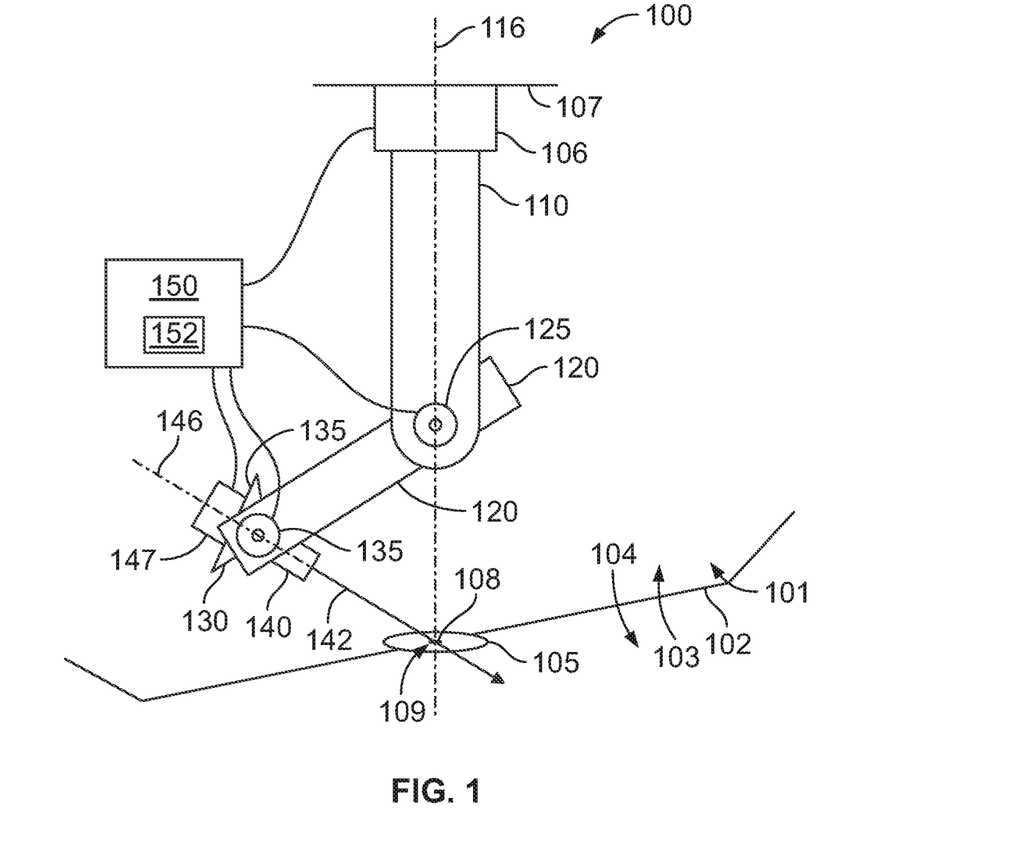
FIG. 1 provides a top schematic view of an optical system, according to an embodiment of the present disclosure.
Figure 2:
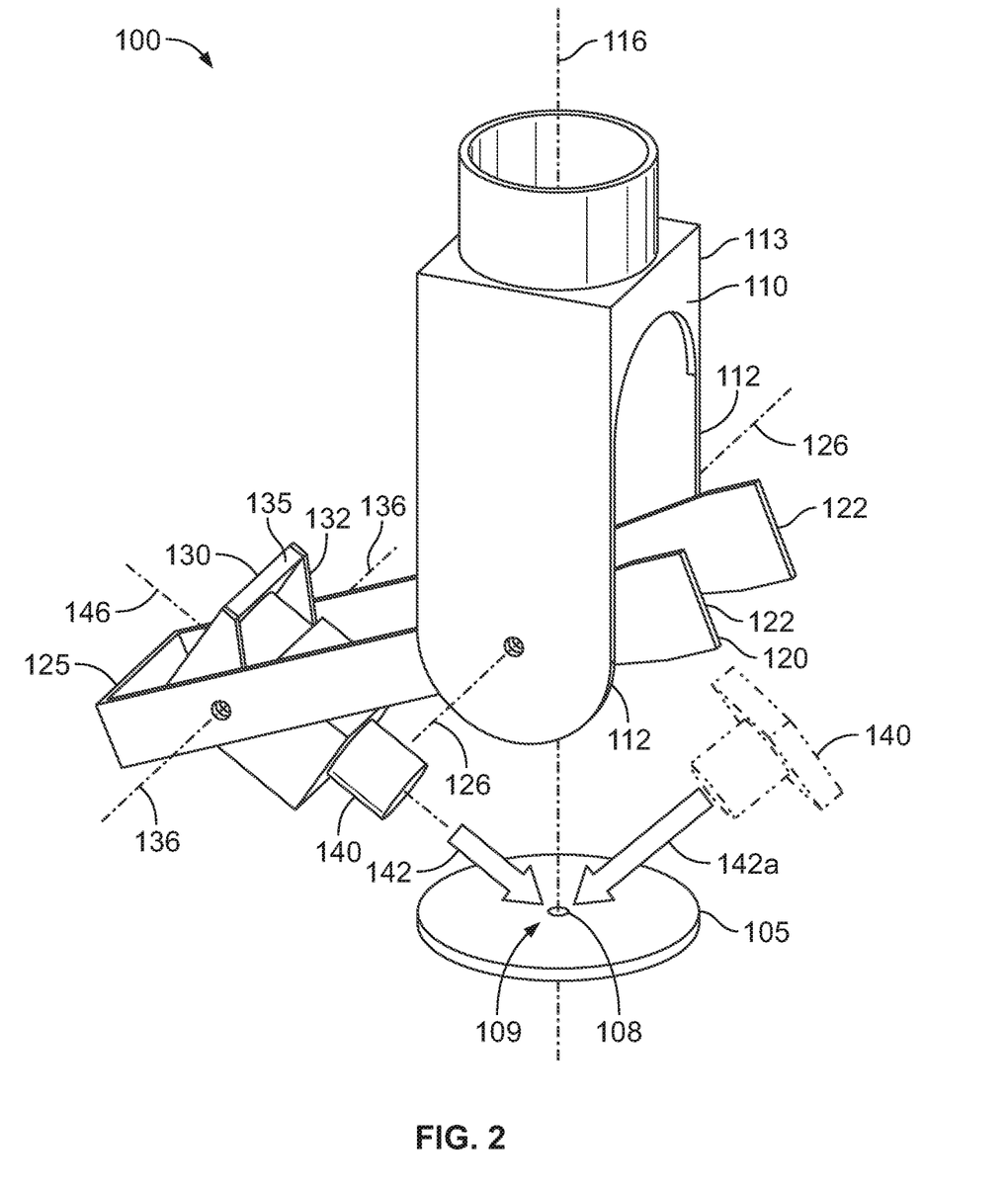
FIG. 2 provides a perspective view of the optical system of FIG. 1.

FIG. 1 provides a schematic top view of a system 100 (e.g., with an aperture or window disposed on the side of an aircraft), and FIG. 2 provides a perspective view of the system 100. It may be noted that the use of "top view" is provided for ease of description and that, depending on the placement and/or orientation of the window or aperture, FIG. 1 may be understood as a side view as well, for example. It may be noted that the window or aperture may be placed for example, on the underside of an aircraft, on the side of an aircraft, or on the front of an aircraft, as examples. Generally speaking, the system 100 orients one or more sensors toward a target object or location on the exterior of an aircraft. For example, the system 100 may direct a camera toward an object of interest outside of the aircraft. As seen in FIGS. 1 and 2, in the illustrated embodiment, the system 100 includes a gimbal yoke 110, a gimbal swing arm 120, an elevation tilt platform 130, a sensor 140, and a controller 150, all of which are disposed within an enclosure 101. It may be noted that the embodiment depicted in FIG. 1 is provided by way of example, and, in other embodiments, one or more aspects of the system 100 depicted in FIG. 1 may be omitted, one or more aspects may be duplicated (e.g., more than one sensor may be utilized, more than one gimbal swing arm may be utilized), or additional aspects may be added.

The depicted enclosure 101 includes a boundary 102 that defines an interior 103 and an exterior 104. For ease of illustration, the boundary 102 is depicted schematically as a line in FIG. 1, but in practice may define a 3-dimensional volume. The boundary 102 may define or conform to the OML of an aircraft. For example, the boundary 102 in various embodiments may be the fuselage or body of an aircraft, the interior 103 may be the interior volume of the aircraft, and the exterior 104 may be an external atmosphere. In the illustrated embodiment, the enclosure 101 includes an aperture 105 disposed along the boundary 102. The aperture 105 in various embodiments is a conformal window that generally adheres to or maintains the profile, shape, or envelope defined by the boundary 102 (e.g., to conform or fit within an OML of an aircraft). In contrast to the depicted aperture 105 or a conformal window, a turret extends beyond a profile, shape, or envelope of a structure associated with the turret, and disrupts the profile, shape, or envelope of such a structure. The aperture 105 in various embodiments provides a passageway for a line of sight from one or more sensors (e.g., sensor 140) to pass from the interior 103 toward a target located in the exterior 104. In the illustrated embodiment, all of the components of the system 100, including the gimbal yoke 110, gimbal swing arm 120, elevation tilt platform 130, sensor 140, and controller 150 are disposed within the interior 103, removing the need for a turret and providing a smooth, generally continuous boundary surface, for example for improved aerodynamics.

The depicted gimbal yoke 110 is disposed within the interior 103, and is configured to rotate about azimuth rotation axis 116. In various embodiments, the gimbal yoke 110 may be mounted (directly or indirectly) to a solid surface or structure within the interior 103. For example, in the depicted embodiment, a gimbal motor 106 is mounted to interior structure 107, and the gimbal yoke 110 is coupled to the gimbal motor 106, with the gimbal motor 106 used to rotate the gimbal yoke 110 (e.g., responsive to a control signal received from the controller 150) about the azimuth rotation axis 116. As best seen in FIG. 2, the gimbal yoke 110 of the illustrated example includes arms 112 extending from a base 113. In the illustrated embodiment, the arms 112 are spaced apart from each other, defining an open space therebetween.

As seen in FIGS. 1 and 2, the gimbal swing arm 120 is rotationally coupled to the gimbal yoke 110. The gimbal swing arm 120 is configured to rotate about an elevation rotation axis 126 that is oriented perpendicular to the azimuth rotation axis 116. In the illustrated embodiment, the elevation rotation axis 126 passes through ends of the arms 112 of the gimbal yoke 110. A shaft and/or pins extending along the elevation rotation axis 126 in various embodiments define pivot points about which the gimbal swing arm 120 rotates. In the illustrated embodiment, as best seen in FIG. 1, a gimbal swing arm motor 125 is mounted to the gimbal yoke 110 and used to rotate the gimbal swing arm 120 (e.g., responsive to a control signal received from the controller 150) about the elevation rotation axis 126. As best seen in FIG. 2, the gimbal swing arm 120 of the illustrated example includes arms 122 extending from a base 125. In the illustrated embodiment, the arms 122 are spaced apart from each other, defining an open space therebetween within which the elevation tilt platform 130 is disposed.

Figures 3, 4:
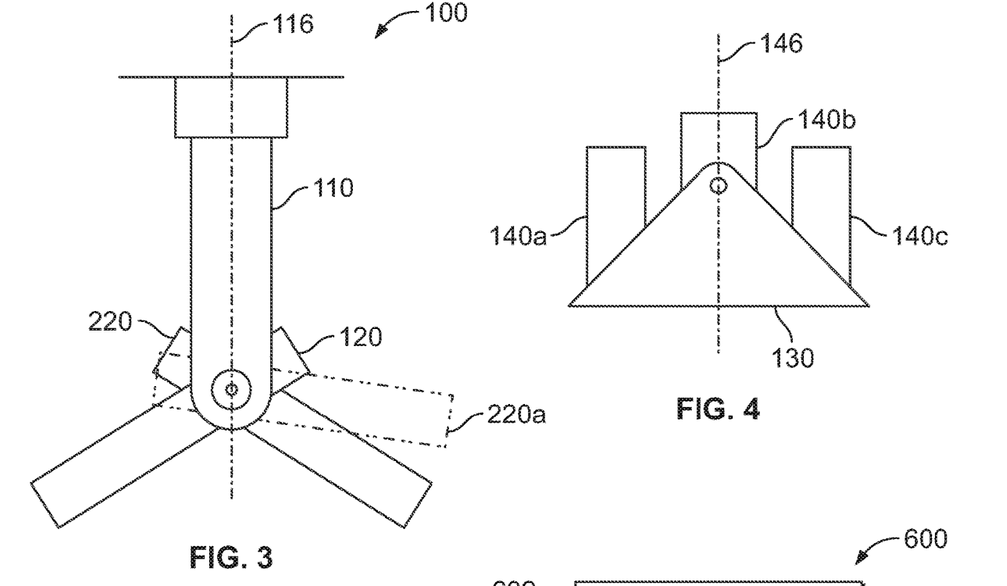
FIG. 3 illustrates a system having an additional gimbal swing arm, according to an embodiment of the present disclosure.
FIG. 4 illustrates a system having plural sensors, according to an embodiment of the present disclosure.

It may be noted that, in various embodiments, more than one gimbal swing arm may be employed. For example, in various embodiments, an additional gimbal swing arm is rotationally coupled to the gimbal yoke 110 and configured to rotate about the elevation rotation axis 116. FIG. 3 illustrates an example embodiment of the system 100 including an additional gimbal swing arm 220 that is rotationally coupled to the gimbal yoke 110 and configured to rotate about the elevation rotation axis 116. It may be noted that, while no elevation tilt platforms and sensors are depicted in FIG. 3 for clarity of illustration, each gimbal swing arm 120, 220 in practice would have a corresponding elevation tilt platform and sensor(s). In some embodiments, the line of sight defined by a sensor associated with the additional gimbal swing arm 220 may pass through the same target point (e.g., target 108) in the aperture 105 as the line of sight defined by a sensor associated with the gimbal swing arm 120, while in other embodiments, the lines of sight may pass through different target points in the aperture 105.

It may be noted that in some embodiments the additional gimbal swing 220 is symmetrical about the azimuth rotation axis 116 with respect to the gimbal swing arm 120, while in other embodiments, the additional gimbal swing arm 220 is asymmetrical about the azimuth rotation axis 116 with respect to the gimbal swing arm 120. As seen in FIG. 3, the additional swing arm 220 depicted in solid lines is disposed symmetrically about the azimuth rotation axis 116 with respect to the gimbal swing arm 120. In contrast, the additional swing arm 220a depicted in phantom lines is disposed asymmetrically about the azimuth rotation axis 116 with respect to the gimbal swing arm 120. Generally, a symmetric arrangement allows for simpler control and/or easier balancing of the system 100, while an asymmetric arrangement allows for additional degrees of freedom to collect various types of information from one or more sources in the exterior 104.

With continued reference to FIGS. 1 and 2, the elevation tilt platform 130 is rotationally coupled to the gimbal swing arm 120. The elevation tilt platform is configured to rotate about a tilt rotation axis 136 that is oriented parallel to the elevation rotation axis 126. In the illustrated embodiment, the tilt rotation axis 136 passes through ends of the arms 122 of the gimbal swing arm 120 near the base 125 of the gimbal swing arm 120. A shaft and/or pins extending along the tilt rotation axis 136 in various embodiments define pivot points about which the elevation tilt platform 130 rotates. In the illustrated embodiment, as best seen in FIG. 1, a tilt platform motor 135 is mounted to the gimbal swing arm 120 and used to rotate the elevation tilt platform 130 (e.g., responsive to a control signal received from the controller 150) about the tilt rotation axis 116. As best seen in FIG. 2, the elevation tilt platform 130 of the illustrated example includes arms 132 extending from a base 135. In the illustrated embodiment, the arms 132 are spaced apart from each other, defining an open space therebetween within which the sensor 140 is disposed, with the sensor 140 mounted to the elevation tilt platform 130 and rotating about the tilt rotation axis 136 with the elevation tilt platform 130. Accordingly, rotation of the elevation tilt platform 130 about the tilt rotation axis 136 adjusts a direction toward which the sensor 140 is oriented.

As seen in FIGS. 1 and 2, the sensor 140 is disposed on the elevation tilt platform 130, and defines a line of sight 142 passing through the aperture 105. In some embodiments, the sensor 140 may be a camera having a field of view, with the line of sight 142 defining a center of the field of view. In other embodiments, the sensor 140 may include a laser, with the line of sight 142 defining the path along which a beam from the laser is directed. In the illustrated embodiment, the line of sight 142 passes through a target 108 of the aperture 105, for example the center 109 of the aperture.

In various embodiments, the sensor 140 is an optical sensor. For example, the sensor 140 may be a camera configured for use in the visible spectrum. As another example, the sensor 140 may be an infrared camera, an ultraviolet camera, or a camera configured for use in a different band. As other example, the sensor 140 may be a laser range finder, or a laser scanner used to measure contours of surfaces. It may be noted that more than one sensor 140 may be utilized in various embodiments. In various embodiments the sensor 140 may also include processing circuitry or hardware for processing information obtained by the sensor 140 and/or communication components for communicating with external devices (e.g., controller 150 or other off-board processor). The sensor 140 may be communicably coupled with the controller 150 and/or other processors via cables, fiber optics, or wireless communication in various embodiments.

In various embodiments, as best seen in FIGS. 1 and 2, the sensor 140 is configured to rotate about an image roll rotation axis 146. In the illustrated embodiment, the image roll rotation axis 146 is perpendicular to the tilt rotation axis 136. Also, the depicted image roll rotation axis 146 is normal to the base 135 of the elevation tilt platform 130, and extends along the line of sight 142 of the sensor 140. The sensor 140 may be rotated about the image roll rotation axis 146 (e.g., via control signals from the controller 150 to a roll motor 147) to maintain a relative orientation of a field of view of the sensor 140 as the gimbal yoke 110 rotates about the azimuth rotation axis 116.

Further, in some embodiments, plural sensors may be utilized. For example, cameras configured to operate over different ranges of wavelengths may be utilized. As another example, a combination of one or more cameras and one or more laser sensors may be employed. FIG. 4 illustrates an example embodiment of the system 100 that utilizes plural sensors 140. In the illustrated embodiment, three sensors 140a, 140b, and 140c are mounted on the elevation tilt platform 130. In the illustrated embodiment, the sensor 140b is mounted along the image roll rotation axis 146, while the sensor 140a and the sensor 140c are mounted offset from the image roll rotation axis 146. In the illustrated embodiment, the lines of sight of each sensor are parallel to each other, so that each line of sight passes through a slightly different point of the aperture 105. In various embodiments, the lines of sight may be oriented at angles to each other to either pass through the same point of the aperture 105 or to pass through more closely distributed points of the aperture 105 than those resulting from parallel lines of sight. It may further be noted that the sensors 140a, 140b, and 140c may be used simultaneously in some embodiments. In other embodiments, the sensors may be used on at a time, with the sensor currently in use positioned with its line of sight extending along the image roll rotation axis 146.

Figure 5:
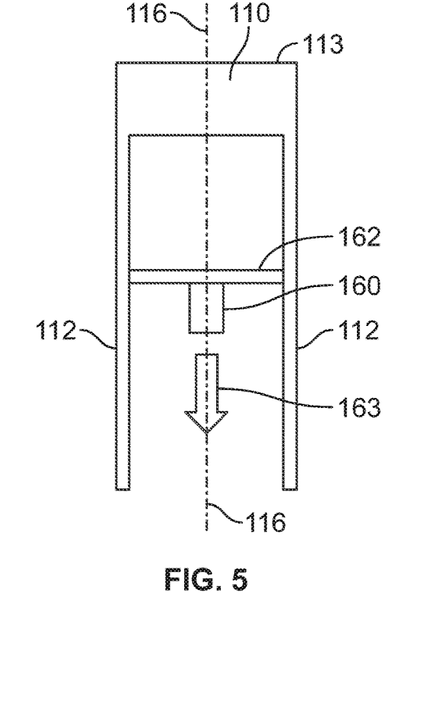
FIG. 5 illustrates a system having a fixed direction sensor, according to an embodiment of the present disclosure.

In addition to sensors disposed on elevation tilt platforms associated with one or more gimbal swing arms, other sensors may be used in various embodiments as well. For example, in some embodiments, a fixed direction sensor may be utilized that has a fixed line of sight. FIG. 5 illustrates an example embodiment of the system 100 that includes a fixed direction sensor 160. The fixed direction sensor 160 is mounted to a base 162 that extends between the arms 112 of the gimbal yoke 110, and has a line of sight 163 that extends along the azimuth rotation axis 116. In various embodiments, for example, the fixed direction sensor 160 may have its line of sight 163 fixed along the azimuth rotation axis 116 and have a relatively wide field of view, while one or more sensors 140 mounted on corresponding elevation tilt platforms have adjustable lines of sight and relatively narrower fields of view, with the fixed direction sensor 160 used to obtain general information of a relative large area and the sensor(s) 140 used to obtain more specific information about a relatively smaller area (or areas). It may be noted that the fixed direction sensor 160 is shown mounted to a fixed base 162 in the illustrated example; however, in alternate embodiments, the fixed direction sensor 160 may be mounted to a corresponding roll axis motor, with the fixed direction sensor 160 rotating about a roll axis that extends along the azimuth rotation axis 116 to compensate for rotation of the gimbal yoke 110 and maintain a consistent orientation of view. In still other embodiments, the base 162 may be tilted or otherwise actuated to allow for adjustment of the line of sight of a sensor mounted to the base 162.

With continued reference to FIG. 1, the depicted controller 150 is operationally coupled to the gimbal yoke 110 (e.g., via gimbal motor 106), the gimbal swing arm 120 (e.g., via gimbal swing arm motor 125), and elevation tilt platform 130 (e.g., via tilt platform motor 135). The controller is configured to articulate the sensor 140 while maintaining the passage of the line of sight 142 through a predetermined target (e.g., target 108) of the aperture 105. Accordingly, as the sensor 140 is articulated within the interior, the line of sight 142 may be directed to different portions of the exterior 104, while the line of sight 142 remains passing through the target 108 of the aperture 105. As such, the line of sight 142 may be understood as pivoting about a fixed point (target 108) interposed between the sensor 140 and an object or location being monitored by the sensor 140. Use of such a fixed point allows for a large field of regard for the sensor 140 while using a relatively small aperture 105. In various embodiments, the predetermined target 108 may be a point that is disposed at the center 109 of the aperture 105, with the azimuth rotation axis 116 passing through the center 109 of the aperture 105. For example, the controller 150 may include information regarding the configuration of the gimbal yoke 110, gimbal swing arm 120, and elevation tilt platform 130 in a memory 152, along with instructions stored in the memory 152 that are utilized by the controller 150 to determine articulations of the gimbal yoke 110, gimbal swing arm 120, and elevation tilt platform 130 to orient the line of sight 142 toward an object or area disposed in the exterior 104 while maintaining the line of sight 142 through the target 108. The controller 150 may then implement the determined articulations via control signals sent to the various motors (or other actuators) associated with the gimbal yoke 110, gimbal swing arm 120, and elevation tilt platform 130. Accordingly, as shown in FIG. 1, the sensor 140 may be moved from a first position (shown in solid lines) to a second position (shown in phantom liones) to have a second line of sight 142a oriented toward a different part of the exterior 104 than the line of sight 142, with both line of sight 142 and second line of sight 142a passing through the target 108 of the aperture 105. Further, the controller 150 may be coupled to the sensor 140 to control operation of the sensor 140 and/or to receive data acquired by the sensor 140.

Generally, for the illustrated embodiment, rotation about the azimuth rotation axis 116 rotates the sensor 140 around a perimeter disposed around the aperture 105, rotation about the elevation rotation axis 126 adjusts a distance (e.g., lateral or horizontal) of the sensor from a surface defined by or including the aperture 105, and rotation about the tilt rotation axis 136 is used to adjust the line of sight 142 (e.g., to maintain the line of sight 142 through a predetermined target point in aperture 105 to compensate for changes caused by movement of the gimbal yoke 110 and/or gimbal swing arm 120). It may be noted that the system 100 may also include one or more positional or rotational sensors coupled to one or more of the gimbal yoke 110, gimbal swing arm 120, or elevation tilt platform 130 to provide feedback (e.g., position, angle, velocity) regarding one or more components of the system 100 to the controller 150 for use in controlling the system 100.

It may be noted that other movements than rotational movements may be utilized in various embodiments. For example, linear articulations of the gimbal yoke 110 and/or gimbal swing arm 120 may be utilized in various embodiments. As one example, interior structure 107 may be articulated linearly within the interior 103 to articulate the entire gimbal yoke 110. As another example, the arms of the gimbal yoke 110 and/or the arms of the gimbal swing arm 120 may be configured for sliding and/or telescoping motions (e.g., to alter a distance between the elevation rotation axis 126 and the tilt rotation axis 136).

Figure 6:
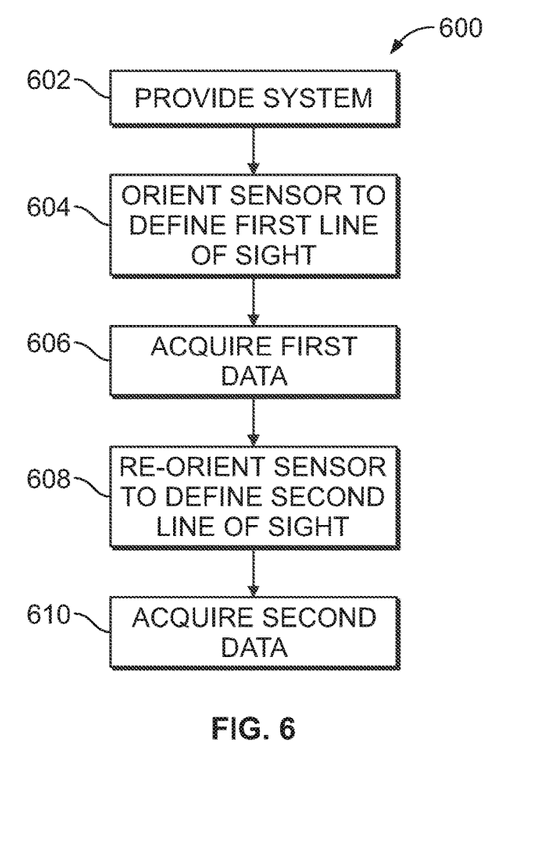
FIG. 6 is a flowchart of a method, according to an embodiment of the present disclosure.

FIG. 6 provides a flowchart of a method 600 (e.g., for positioning and use of a sensor), in accordance with various embodiments. For example, the method 600 may be utilized in connection with an aircraft to gather information regarding an external volume through which the aircraft moves. The method 600, for example, may employ or be performed by structures or aspects of various embodiments (e.g., systems and/or methods and/or process flows) discussed herein. For example, one or more processors may be programmed with instructions stored in a memory that cause the processor to perform one or more of the steps of the method 600. In various embodiments, certain steps may be omitted or added, certain steps may be combined, certain steps may be performed concurrently, certain steps may be split into multiple steps, or certain steps may be performed in a different order.

At 602, a system (e.g., system 100) is provided (e.g., positioned or disposed) within an enclosure having a boundary defining an interior and an exterior. The enclosure includes an aperture that is disposed along the boundary. For example, the system may be disposed within an aircraft, with the aperture being an exit window that is generally flush mounted with a surface or structure defining a portion of the boundary. In various embodiments, the system includes a gimbal yoke (e.g., gimbal yoke 110), a gimbal swing arm (e.g., gimbal swing arm 120), an elevation tilt platform (e.g., elevation tilt platform 130), and a sensor (e.g., sensor 140). The gimbal yoke 110 may be disposed within the interior of the enclosure (e.g. mounted or attached to a structure within the enclosure), and is configured to rotate about an azimuth rotation axis. The gimbal swing arm is rotationally coupled to the gimbal yoke and configured to rotate about an elevation rotation axis that is oriented perpendicular to the azimuth rotation axis. The elevation tilt platform is rotationally coupled to the gimbal swing arm and is configured to rotate about a tilt rotation axis that is oriented parallel to the elevation rotation axis. The sensor is disposed on the elevation tilt platform and defines a line of sight passing through the aperture.

At 604, the system is controlled (e.g., one or more control signals are provided to one or more corresponding motors or actuators to articulate one or more of the gimbal yoke, gimbal swing arm, or elevation tilt platform) to orient the sensor to define a first line of sight passing through a predetermined target point on the aperture. For example, the predetermined target point of the aperture may be disposed at the center of the aperture and along the azimuth rotation axis which passes through the center of the aperture. The line of sight passes through the aperture and into the exterior surrounding the enclosure, for example to be oriented or directed toward an object or location in the exterior disposed along or near the line of sight (e.g., within a field of view of the sensor).

At 606, first data (e.g., optical imaging information) is acquired using the sensor oriented along the first line of sight. The data may be communicated to one or more processors for storage and/or processing.

At 608, the system is controlled (e.g., one or more control signals are provided to one or more corresponding motors or actuators to articulate one or more of the gimbal yoke, gimbal swing arm, or elevation tilt platform) to re-orient the sensor to define a second line of sight passing through the predetermined target point on the aperture. The second line of sight is at a different angle to the aperture but passes through the same target point on aperture, allowing for use of an aperture having a relatively small surface area. The second line of sight may be utilized to acquire information for a different object (or location) in the exterior than the first line of sight, or may be used for acquiring information for the same object (or location) if the object (or location) has moved relative to the system (e.g., as an aircraft flies by the object or location). It may be noted that, in various embodiments, the sensor may also be rotated about an image roll rotation axis that is perpendicular to the tilt rotation axis (e.g., with the image roll rotation axis extending along the line of sight) as the sensor is re-oriented to the second line of sight.

At 610, second data is acquired using the sensor oriented along the second line of sight. It may be at 606 and/or at 608, additional data may be acquired that includes data acquired with additional sensors, such as with a fixed direction sensor (e.g., fixed direction sensor 160) that has a line of sight along the azimuth rotation axis. It may be noted that, in some embodiments, data may be acquired during movement of the sensor, with the line of sight maintained oriented through the target (e.g., center of aperture) during the movement of the sensor and collection of data. For example, the sensor may be controlled to maintain its line of sight oriented toward an object that is moving with respect to the aircraft.

Figure 7:
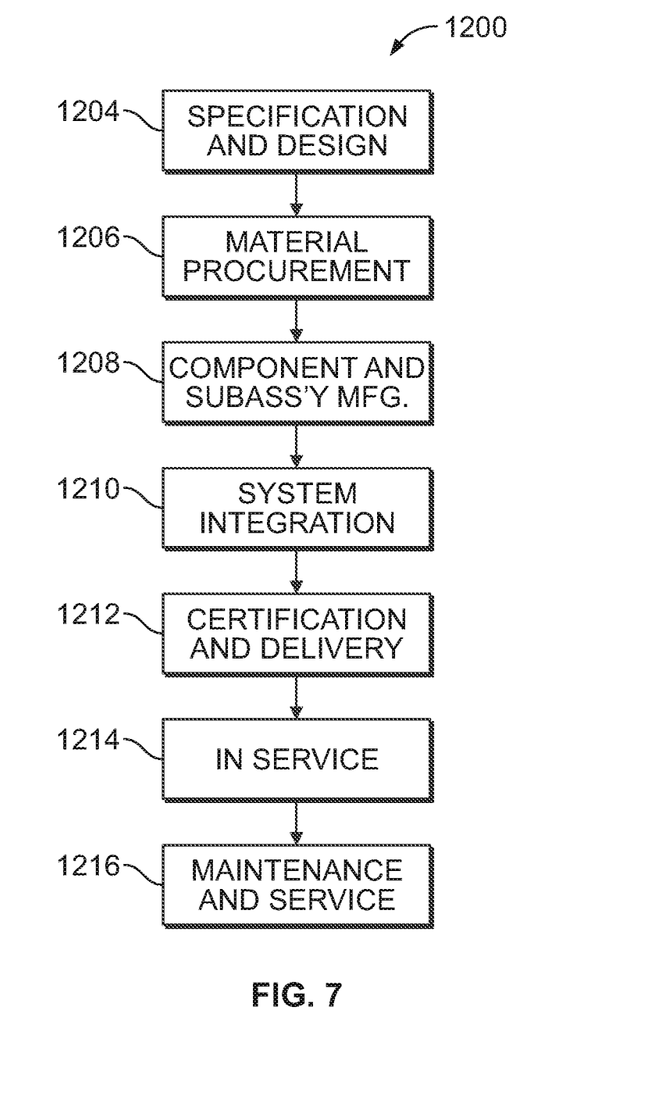
FIG. 7 is a block diagram of aircraft production and service methodology.
Figure 8:
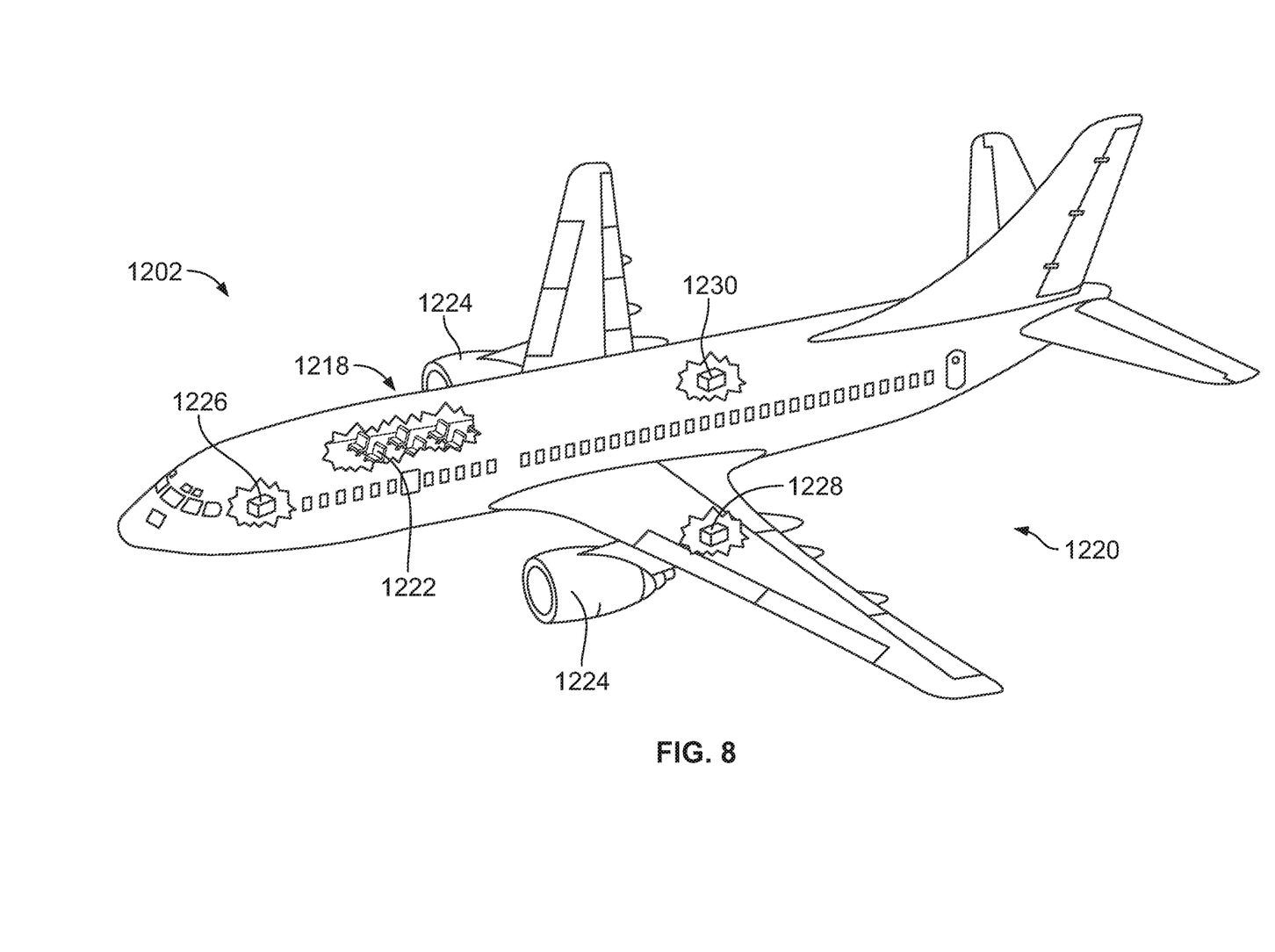
FIG. 8 is a schematic illustration of an aircraft.

Examples of the present disclosure may be described in the context of aircraft manufacturing and service method 1200 as shown in FIG. 7 and aircraft 1202 as shown in FIG. 8. During pre-production, method 1200 may include specification and design (block 1204) of aircraft 1202 and material procurement (block 1206). During production, component and subassembly manufacturing (block 1208) and system integration (block 1210) of aircraft 1202 may take place. Thereafter, aircraft 1202 may go through certification and delivery (block 1212) to be placed in service (block 1214). While in service, aircraft 1202 may be scheduled for routine maintenance and service (block 1216). Routine maintenance and service may include modification, reconfiguration, refurbishment, etc. of one or more systems of aircraft 1202. For example, in various embodiments, examples of the present disclosure may be used in conjunction with one or more of blocks 1208, 1210, or 1216.

Each of the processes of illustrative method 1200 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 8, aircraft 1202 produced by illustrative method 1200 may include airframe 1218 with a plurality of high-level systems 1220 and interior 1222. Examples of high-level systems 1220 include one or more of propulsion system 1224, electrical system 1226, hydraulic system 1228, and environmental system 1230. Any number of other systems may be included. Although an aerospace example is shown, the principles disclosed herein may be applied to other industries, such as the automotive industry. Accordingly, in addition to aircraft 1202, the principles disclosed herein may apply to other vehicles, e.g., land vehicles, marine vehicles, space vehicles, etc. In various embodiments, examples of the present disclosure may be used in conjunction with one or more of airframe 1218 or interior 1222.

Apparatus(es) and method(s) shown or described herein may be employed during any one or more of the stages of the manufacturing and service method 1200. For example, components or subassemblies corresponding to component and subassembly manufacturing 1208 may be fabricated or manufactured in a manner similar to components or subassemblies produced while aircraft 1202 is in service. Also, one or more examples of the apparatus(es), method(s), or combination thereof may be utilized during production stages 1208 and 1210, for example, by substantially expediting assembly of or reducing the cost of aircraft 1202. Similarly, one or more examples of the apparatus or method realizations, or a combination thereof, may be utilized, for example and without limitation, while aircraft 1202 is in service, e.g., maintenance and service stage (block 1216).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
   a gimbal yoke configured to rotate about an azimuth rotation axis;
   a gimbal swing arm rotationally coupled to the gimbal yoke and configured to rotate about an elevation rotation axis, the elevation rotation axis oriented perpendicular to the azimuth rotation axis;
   an elevation tilt platform rotationally coupled to the gimbal swing arm and configured to rotate about a tilt rotation axis, the tilt rotation axis oriented parallel to the elevation rotation axis;
   a first sensor disposed on the elevation tilt platform, the first sensor defining a line of sight; and
   an additional gimbal swing arm rotationally coupled to the gimbal yoke and configured to rotate about the elevation rotation axis.

2. The system of claim 1, wherein the additional gimbal swing arm is symmetrical about the azimuth rotation axis with the gimbal swing arm.

3. The system of claim 1, wherein the additional gimbal swing arm is asymmetrical about the azimuth rotation axis with the gimbal swing arm.

4. The system of claim 1, wherein the first sensor is configured to rotate about an image roll rotation axis, the image roll rotation axis perpendicular to the tilt rotation axis.

5. The system of claim 1, comprising plural first sensors mounted to the elevation tilt platform.

6. The system of claim 1, further comprising a second sensor having a line of sight along the azimuth rotation axis.

7. The system of claim 1, further comprising an enclosure, wherein the gimbal yoke, the gimbal swing arm, the elevation platform, and the first sensor are within the enclosure.

8. The system of claim 1, further comprising a controller operationally coupled to the gimbal yoke, gimbal swing arm, and elevation tilt platform, the controller configured to articulate the first sensor while maintaining passage of the line of sight through a predetermined target point.

9. The system of claim 8, wherein the predetermined target point is disposed at a center of an aperture, wherein the azimuth rotation axis passes through the center of the aperture.

10. A system comprising:
an enclosure having a boundary defining an interior and an exterior, the enclosure comprising an aperture disposed along the boundary;
a gimbal yoke disposed within the interior of the enclosure and configured to rotate about an azimuth rotation axis;
a gimbal swing arm rotationally coupled to the gimbal yoke and configured to rotate about an elevation rotation axis, the elevation rotation axis oriented perpendicular to the azimuth rotation axis;
an elevation tilt platform rotationally coupled to the gimbal swing arm and configured to rotate about a tilt rotation axis, the tilt rotation axis oriented parallel to the elevation rotation axis;
a first sensor disposed on the elevation tilt platform, the first sensor defining a line of sight passing through the aperture; and
an additional gimbal swing arm rotationally coupled to the gimbal yoke and configured to rotate about the elevation rotation axis.

11. The system of claim 10, wherein the first sensor is configured to rotate about an image roll rotation axis, the image roll rotation axis perpendicular to the tilt rotation axis.

12. The system of claim 10, comprising plural first sensors mounted to the elevation tilt platform.

13. The system of claim 10, further comprising a second sensor having a line of sight along the azimuth rotation axis.

14. The system of claim 10, wherein the gimbal swing arm and the elevation tilt platform are disposed within the interior of the enclosure.

15. The system of claim 10, further comprising a controller operationally coupled to the gimbal yoke, gimbal swing arm, and elevation tilt platform, the controller configured to articulate the first sensor while maintaining passage of the line of sight through a predetermined target point on the aperture.

16. The system of claim 15, wherein the predetermined target point is disposed at the center of the aperture, wherein the azimuth rotation axis passes through the center of the aperture.

17. A method comprising:
providing a system within an enclosure having a boundary defining an interior and an exterior, the enclosure comprising an aperture disposed along the boundary, the system comprising:
a gimbal yoke disposed within the interior of the enclosure and configured to rotate about an azimuth rotation axis;
a gimbal swing arm disposed within the interior of the enclosure, the gimbal swing arm rotationally coupled to the gimbal yoke and configured to rotate about an elevation rotation axis, the elevation rotation axis oriented perpendicular to the azimuth rotation axis;
an elevation tilt platform disposed within the interior of the enclosure, the elevation tilt platform rotationally coupled to the gimbal swing arm and configured to rotate about a tilt rotation axis, the tilt rotation axis oriented parallel to the elevation rotation axis;
a first sensor disposed on the elevation tilt platform within the interior of the enclosure, the first sensor defining a line of sight passing through the aperture; and
an additional gimbal swing arm rotationally coupled to the gimbal yoke and configured to rotate about the elevation rotation axis;
controlling the system to orient the first sensor to define a first line of sight passing through a predetermined target point on the aperture;
acquiring first data using the first sensor oriented along the first line of sight;
controlling the system to re-orient the first sensor to define a second line of sight passing through the predetermined target point on the aperture; and
acquiring second data using the first sensor oriented along the second line of sight.

18. The method of claim 17, wherein the predetermined target point is disposed at the center of the aperture, wherein the azimuth rotation axis passes through the center of the aperture.

19. The method of claim 17, further comprising rotating the first sensor about an image roll rotation axis, the image roll rotation axis perpendicular to the tilt rotation axis.

20. The method of claim 17, further comprising acquiring additional data with a second sensor having a line of sight along the azimuth rotation axis.

* * * * *